(12) United States Patent
Kato

(10) Patent No.: US 9,124,843 B2
(45) Date of Patent: Sep. 1, 2015

(54) DEVICE MANAGEMENT SYSTEM, PERIPHERAL DEVICE, AND METHOD THEREFOR FOR MANAGING DEVICE INFORMATION OF A PERIPHERAL DEVICE

(71) Applicant: CANON KABUSHIKI KAISHA, Tokyo (JP)

(72) Inventor: Kazunori Kato, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 5 days.

(21) Appl. No.: 14/053,463

(22) Filed: Oct. 14, 2013

(65) Prior Publication Data
US 2014/0104638 A1 Apr. 17, 2014

(30) Foreign Application Priority Data
Oct. 16, 2012 (JP) .................................. 2012-229039

(51) Int. Cl.
*H04N 1/44* (2006.01)
(52) U.S. Cl.
CPC ............... *H04N 1/44* (2013.01); *H04N 1/4413* (2013.01); *H04N 1/4426* (2013.01)
(58) Field of Classification Search
None
See application file for complete search history.

(56) References Cited

U.S. PATENT DOCUMENTS

2011/0001995 A1* 1/2011 Sato .............................. 358/1.11

FOREIGN PATENT DOCUMENTS

| JP | 2005-523505 A | 8/2005 |
| JP | 2006-99741 A | 4/2006 |

* cited by examiner

*Primary Examiner* — Ashish K Thomas
(74) *Attorney, Agent, or Firm* — Canon USA, Inc., IP Division

(57) ABSTRACT

The present invention relates to a device management system including a peripheral device, a management server configured to manage device information of the peripheral device, and a terminal communicable with the management server. In the device management system, the management server registers key obtaining information received from the terminal while associating the key obtaining information with device identification information of the peripheral device and an authentication key managed by the management server. The management server determines whether the key obtaining information, from the terminal, that is registered while being associated with the device identification information contained in an obtaining request received from the peripheral device matches the key obtaining information contained in the received obtaining request.

13 Claims, 20 Drawing Sheets

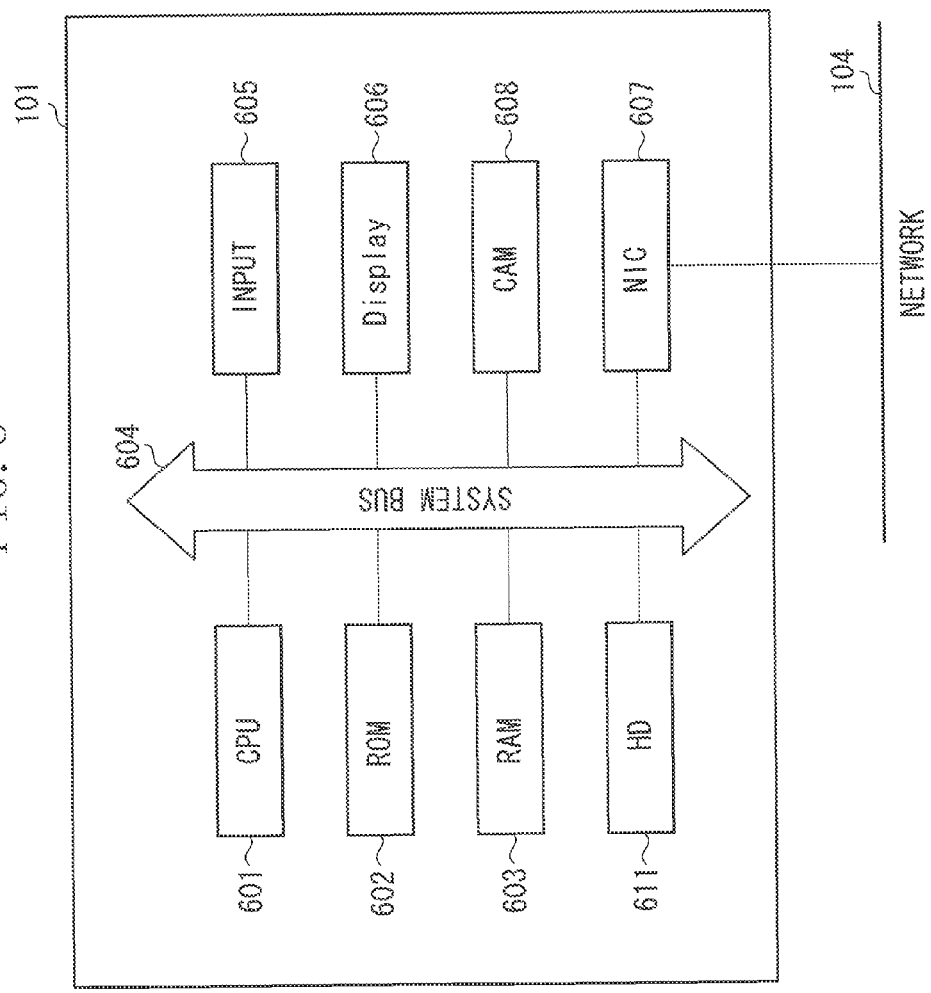

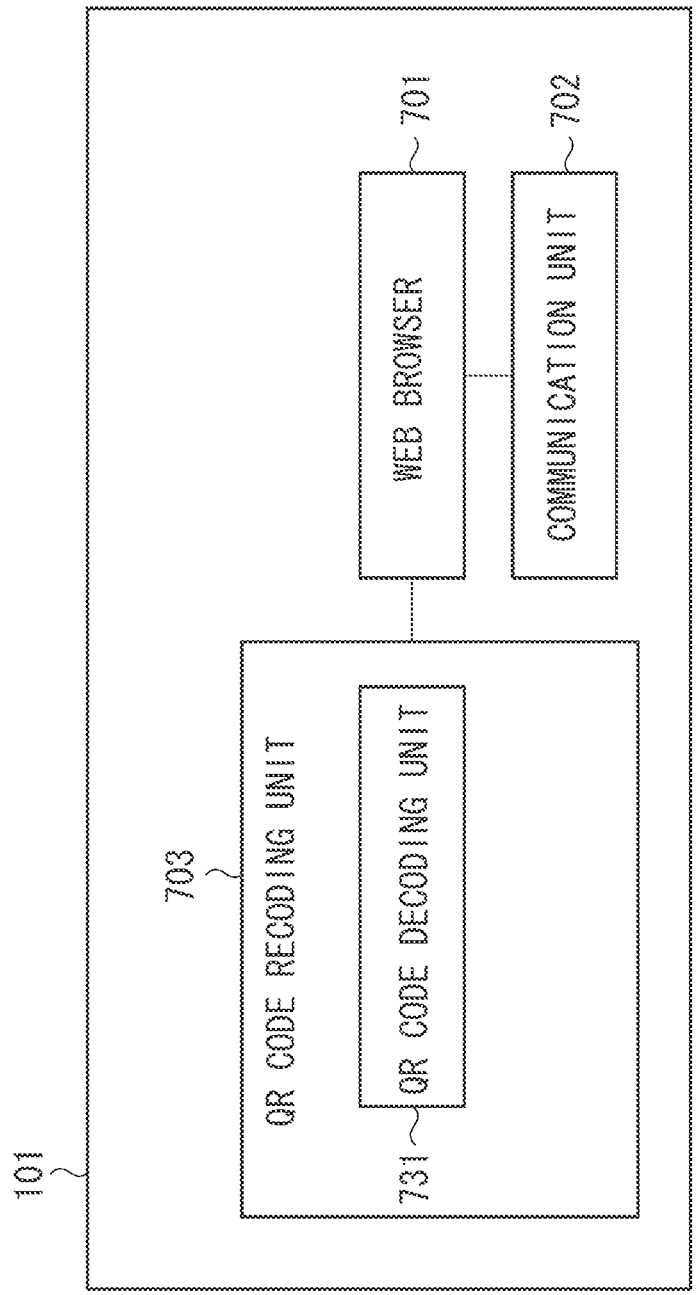

FIG. 8A

331 CUSTOMER MANAGEMENT TABLE

| CUSTOMER ID | CUSTOMER NAME | DEVICE REGISTRATION CODE |
|---|---|---|
| AA123 | AA INC. | 123456 |
| BB234 | BB INC. | 456789 |
| CC345 | CC CONSTRUCTION LTD. | 987654 |

FIG. 8B

332 DEVICE MANAGEMENT TABLE

| CUSTOMER ID | SERIAL NO. | AUTHENTICATION KEY |
|---|---|---|
| AA123 | QWE1234 | 1qazxsw2 |
| BB234 | ASD3456 | cde34rfv |
| BB234 | RTY3456 | 9ijnbgt5 |
| CC345 | ZXC5678 | 5tgbnhy6 |
| CC345 | FGH5678 | 23erfgbn |

FIG. 8C

333 DEVICE REGISTRATION CONTROL TABLE

| AUTHENTICATION KEY OBTAINING ID 821 | SERIAL NO. 822 | CUSTOMER ID 823 | AUTHENTICATION KEY 824 | OBTAINABLE DEADLINE 825 |
|---|---|---|---|---|
| zse45tfc | QWE1234 | AA123 | 1qazxsw2 | 7/1/2012 12:00 |
| nhy67tfc | ASD3456 | BB234 | cde34rfv | 7/1/2012 12:01 |
| mju7t5dx | RTY3456 | BB234 | 9ijnbgt5 | 7/1/2012 12:02 |
| 9ijnhy6b | ZXC5678 | CC345 | 5tgbnhy6 | 7/1/2012 12:03 |

FIG. 8D

334 JOB HISTORY INFORMATION TABLE

| CUSTOMER ID | SERIAL NO. | JOB TYPE | START TIME | END TIME | NUMBER OF PAGE(S) | DOCUMENT NAME |
|---|---|---|---|---|---|---|
| AA123 | QWE1234 | COPY | 9/25/2009 14:25 | 9/25/2009 14:40 | 4 | |
| AA123 | QWE1234 | PRINT | 9/26/2009 9:01 | 9/26/2009 9:10 | 1 | a.doc |
| AA123 | QWE1234 | COPY | 9/26/2009 9:10 | 9/26/2009 9:10 | 5 | |
| CC345 | ZXC5678 | PRINT | 9/26/2009 10:12 | 9/26/2009 10:13 | 10 | p.pdf |

831 832 833 834 835 836 837

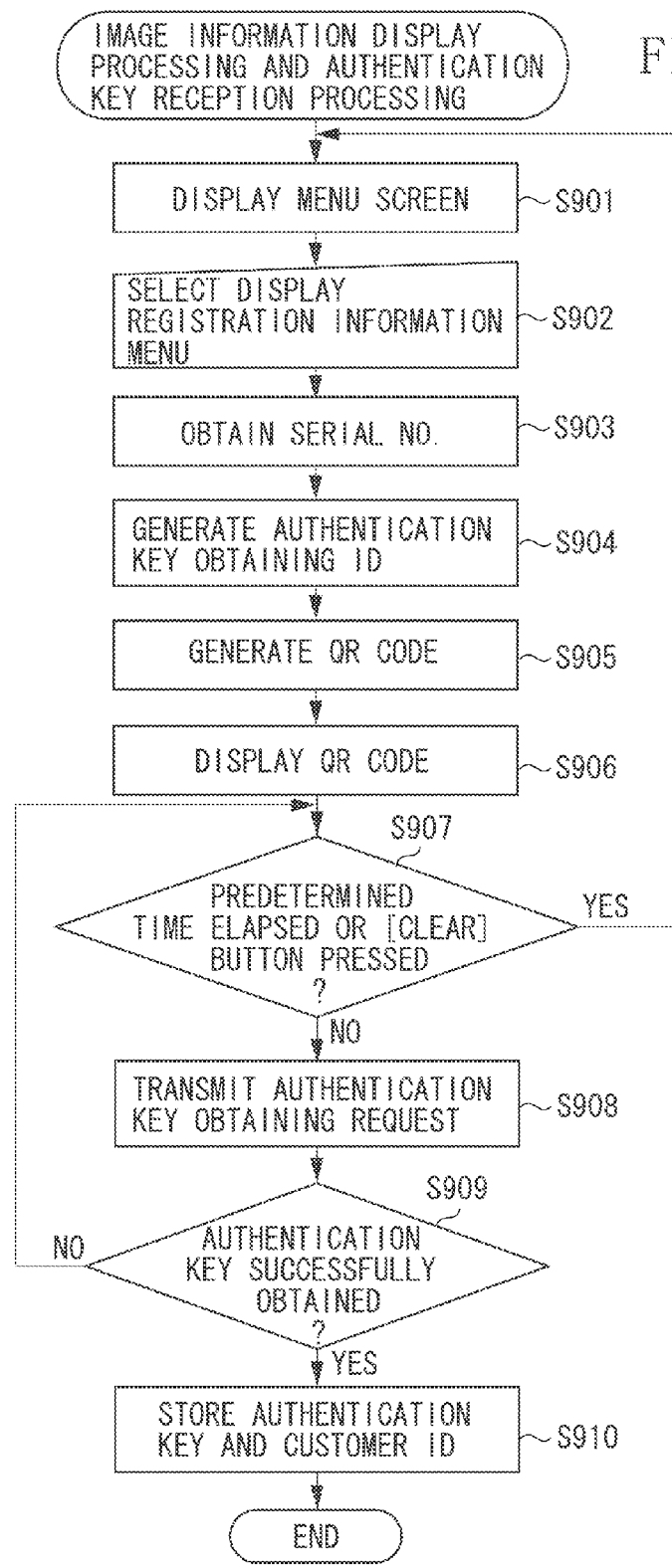

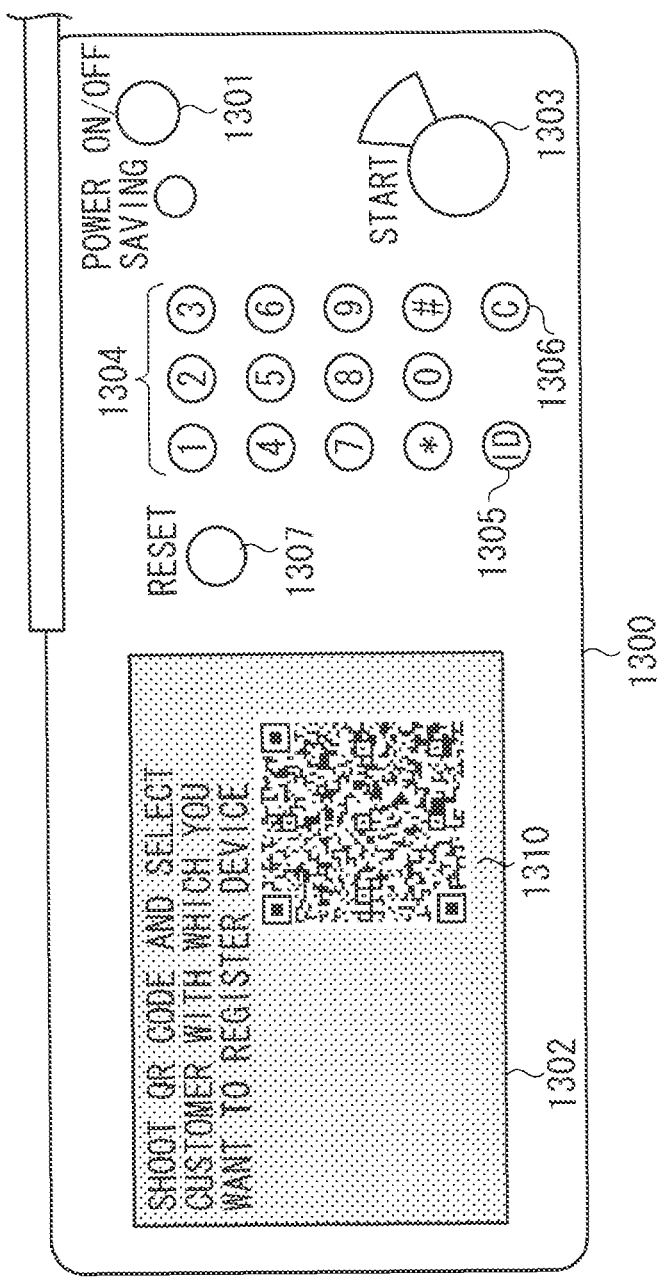

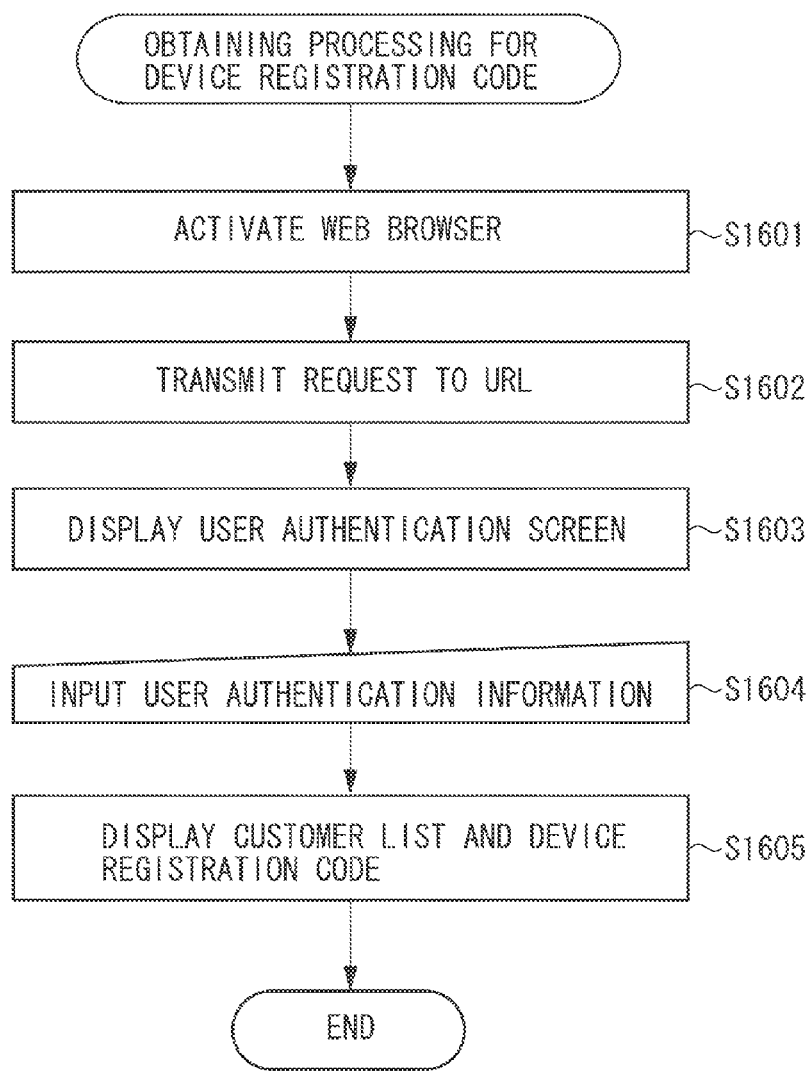

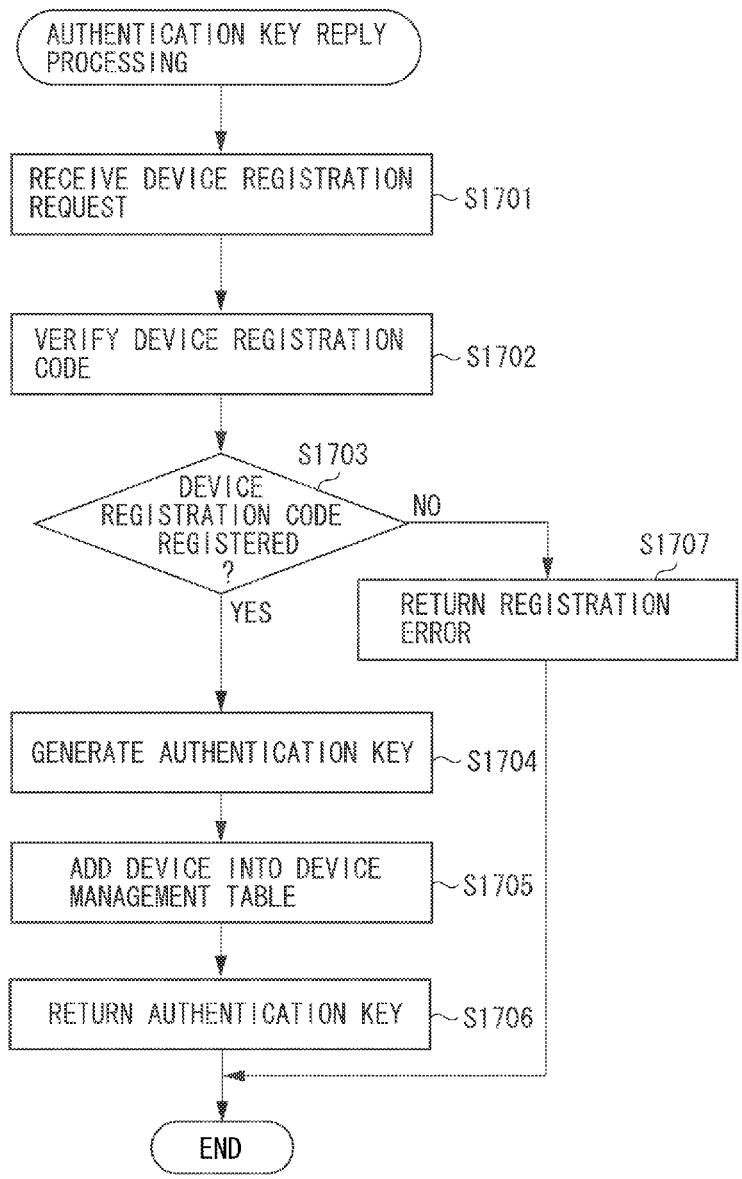

DEVICE MANAGEMENT SYSTEM, PERIPHERAL DEVICE, AND METHOD THEREFOR FOR MANAGING DEVICE INFORMATION OF A PERIPHERAL DEVICE

BACKGROUND OF THE INVENTION

1. Field of the Invention

The present invention relates to a technique for managing device information of a peripheral device.

2. Description of the Related Art

There are device management systems that register a peripheral device connected via a network, manage the registered peripheral device, and manage device information of the registered peripheral device.

Some device management systems are used by a user (a service provider that manages peripheral devices) to manage devices of a plurality of customers (individual people and companies that own the peripheral devices). Such device management systems register and manage for each customer the peripheral devices in a management server. When a device management server and the peripheral devices communicate with each other, they use an authentication key.

Japanese Patent Application Laid-Open No. 2006-99741 discusses a document management server that associates a group to which an output device belongs with a group to which a document permitted by the output device belongs, and stores this information as management information.

Further, Japanese Unexamined Patent Application Publication (Translation of PCT Application) No. 2005-523505 discusses a method by which a trusted party transmits an authentication response message for authentication for a transaction between the account owner and a requesting party in payment by a credit card.

When a peripheral device is to be registered in such a device management service, a user has to operate an operation panel to specify a customer of a registration destination with which the peripheral device is to be registered from a plurality of customers managed by the user.

One possible method for specifying the customer of the registration destination is to operate the operation panel of the peripheral device to log in the device management service to select the customer of the registration destination from a customer list. However, the customer list may be unable to be displayed due to a lack of the operation panel or limited operability of the operation panel, depending on the type of the peripheral device.

Further, another possible method is to select the customer of the registration destination with which the peripheral device is to be registered by accessing the peripheral device via a web browser that operates on a personal computer (PC). However, it may be difficult for the user to bring in a PC and connect the PC to a customer's network in light of security depending on the customer's environment.

SUMMARY OF THE INVENTION

The present invention is directed to providing a method for registering a peripheral device according to the type of the peripheral device and a customer's environment in which the peripheral device is installed, when a user registers the peripheral device with a management server.

According to an aspect of the present invention, a device management system includes a peripheral device, a management server configured to manage device information of the peripheral device, and a terminal communicable with the management server. The peripheral device includes a first generation unit configured to generate key obtaining information for obtaining from the management server an authentication key for generating signature information to be used in transmission of the device information, and a first transmission unit configured to transmit a request for obtaining the authentication key that contains the key obtaining information and device identification information of the peripheral device, to the management server. The terminal includes an obtaining unit configured to obtain the key obtaining information from the peripheral device, and a second transmission unit configured to transmit the key obtaining information obtained by the obtaining unit to the management server. The management server includes a first reception unit configured to receive the key obtaining information from the terminal, a registration unit configured to register the key obtaining information received from the terminal while associating the key obtaining information with the device identification information of the peripheral device and the authentication key managed by the management server, a second reception unit configured to receive the obtaining request from the peripheral device, a determination unit configured to determine whether the key obtaining information that is registered while being associated with the device identification information contained in the received obtaining request from the terminal matches a key obtaining information contained in the received obtaining request, and a response unit configured to, if the determination unit determines that they match each other, transmit the authentication key associated with the key obtaining information received from the terminal to the peripheral device as a response to the obtaining request.

Further features and aspects of the present invention will become apparent from the following description of exemplary embodiments with reference to the attached drawings.

BRIEF DESCRIPTION OF THE DRAWINGS

FIG. 6 is a block diagram illustrating a hardware configuration of a mobile terminal 101.

FIG. 7 is a block diagram illustrating a software configuration of the mobile terminal 101.

FIGS. 8A, 8B, 8C, and 8D illustrate tables indicating examples of a customer management table 331, a device management table 332, a device registration control table 333, and a job history information table 334 managed by the device management server 103.

FIG. 9 is a flowchart illustrating a flow of image information display processing and authentication key reception processing, which are processed in the peripheral device 102.

FIG. 13 illustrates an example of a user interface of the peripheral device 102.

FIG. 16 is a flowchart illustrating a flow of obtainment processing of a device registration code 803, which is processed in the mobile terminal 101.

FIG. 17 is a flowchart illustrating a flow of device reception processing, which is processed in the device management server 103, according to a third exemplary embodiment.

DESCRIPTION OF THE EMBODIMENTS

A first exemplary embodiment will be described.

Figure 1:
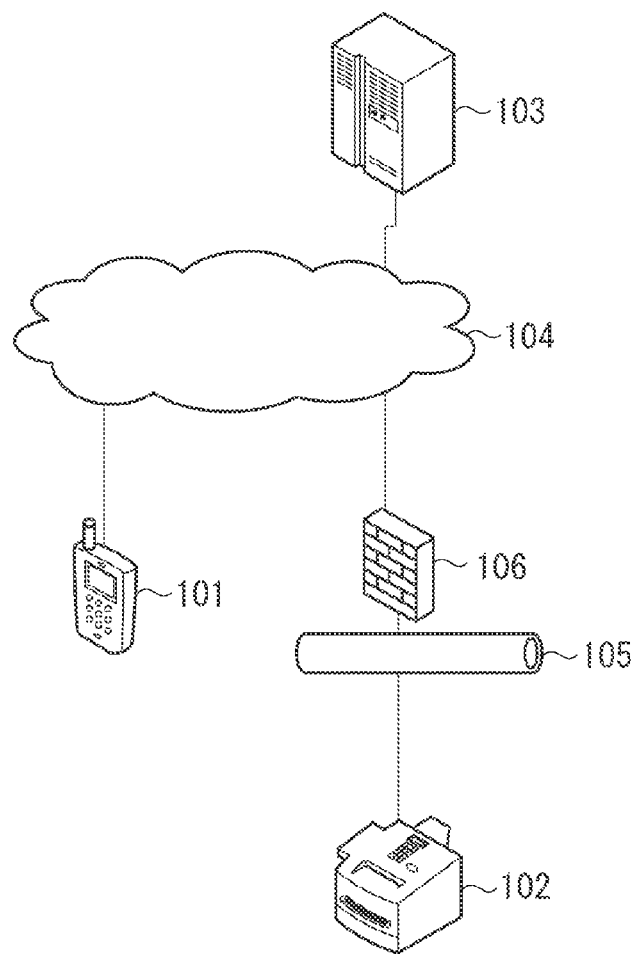
FIG. 1 illustrates an overall configuration of a device management system.

FIG. 1 illustrates an overall configuration of a device management system according to the first exemplary embodiment of the present invention. In FIG. 1, a mobile terminal 101 (hereinafter referred to as a terminal 101) and a device management server 103 (hereinafter referred to as a management server 103) are connected to a network 104. Further, a peripheral device 102 is connected to the network 104 via a customer network 105 and a firewall 106. FIG. 1 illustrates only a single peripheral device 102, but the device management system may include a plurality of peripheral devices 102. According to the present exemplary embodiment, a user (a device management service provider) registers the peripheral device 102 with the management server 103. The management server 103 manages device information of the peripheral device 102 registered with the management server 103 itself. The device information includes a history of job(s) carried out by the peripheral device 102, information for identifying the peripheral device 102, and the like. The present exemplary embodiment will be described assuming that the device information is the job history.

The terminal 101 is, for example, a smart-phone, and is connected to the network 104 via a network provided by a mobile phone provider. A firewall may be also provided between the terminal 101 and the network 104. Further, the terminal 101 includes a display such as a touch panel, an operation panel, and a camera.

The peripheral device 102 is, for example, a digital multifunction peripheral, which has a scan function, a print function, a copy function, an electronic mail function, a facsimile function, and the like, or a printer. For example, the peripheral device 102 receives print data from a PC (not illustrated) via the customer network 105, and prints the data on a sheet using a known print technique such as the electrophotographic technique or the inkjet technique. The customer network 105 will be described below. Because the peripheral device 102 is connected to the network 104 via the firewall 106, communication transmitted from the terminal 101 and the management server 103 connected to the network 104 to the peripheral device 102 is rejected by the firewall 106. When the peripheral device 102 communicates with the terminal 101 and the management server 103, data should be transmitted from the peripheral device 102. When the peripheral device 102 transmits its own device information, the peripheral device 102 generates signature information in which the device information is encoded with use of an authentication key, and transmits the generated signature information to the management server 103 together with the device information. The signature information is information used when the peripheral device 102 proves its own identity, and when the management server 103, which received the device information, certifies that the device information transmitted from the peripheral device 102 is not fabricated or altered.

The management server 103 is a server that manages various kinds of information of the peripheral device 102. The peripheral device 102 is managed for each customer that owns the peripheral device 102. Further, the job history of the peripheral device 102 is managed for each peripheral device 102. The management server 103 is opened on the network 104, and is communicable from the terminal 101 and the peripheral device 102. Upon reception of the job history from the peripheral device 102, the management server 103 certifies that this job history is received from the peripheral device 102 that the management server 103 itself manages. If the management server 103 certified that the job history is received from the peripheral device 102 that the management server 103 itself manages, the management server 103 stores and manages the received job history while associating the job history with a serial number (No.), which is individual identification information for identifying this peripheral device 102. The verification method will be described below.

The network 104 is a line for connecting the respective devices to one another, and is a network based on a known technique such as the Internet.

Figure 2:
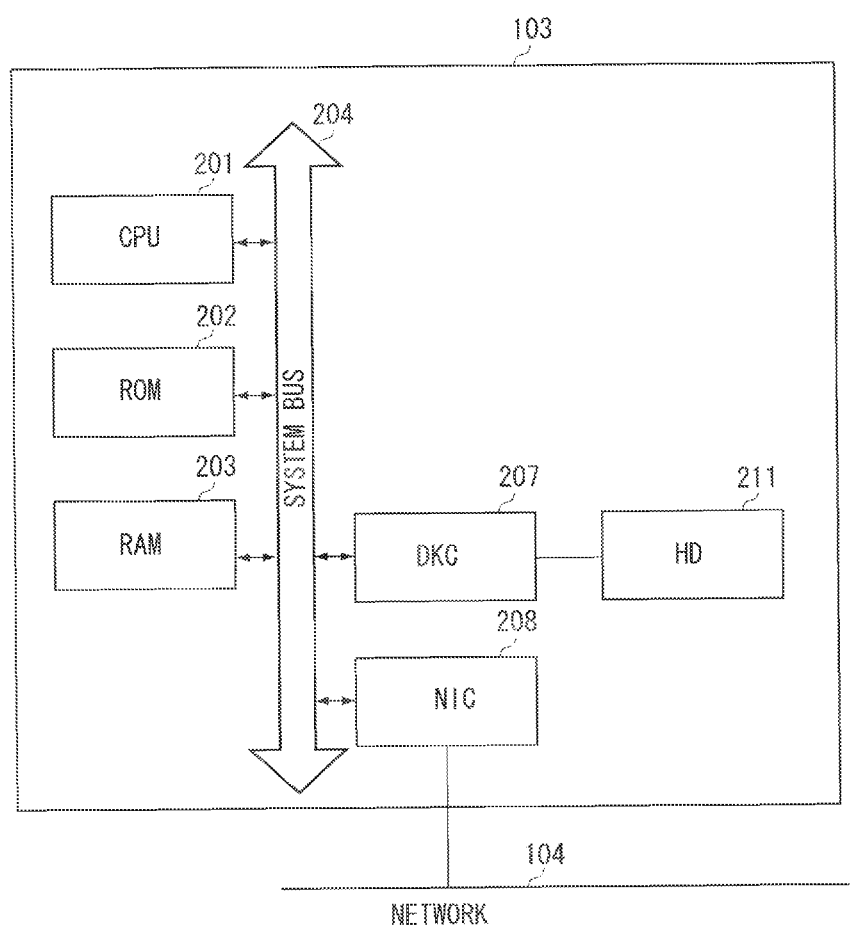
FIG. 2 is a block diagram illustrating a hardware configuration of a device management server 103.

FIG. 2 is a block diagram illustrating a hardware configuration of the management server 103. A central processing unit (CPU) 201 is a controller that executes a program, controls various kinds of processing, and controls respective components connected to a system bus 204. The CPU 201 loads software stored in a read only memory (ROM) 202 or a hard disk (HD) 211, which is a mass storage device, to a random access memory (RAM) 203, and executes the loaded software. The ROM 202 is a data read only memory, and stores a basic control program of the system. The RAM 203 is a data read and write memory, and is used for various kinds of calculation processing by the CPU 201 and a temporary data storage. A disk controller (DKC) 207 controls data access in the HD 211, which stores various kinds of data, and the like. A network interface card (NIC) 208 executes communication control processing, the communication with another device connected to the network 104. The HD 211 stores a system program of an operating system and an application program of the management server 103, and is also used as, for example, a temporary storage area during data processing. These devices are connected to the system bus 204.

Figure 3:
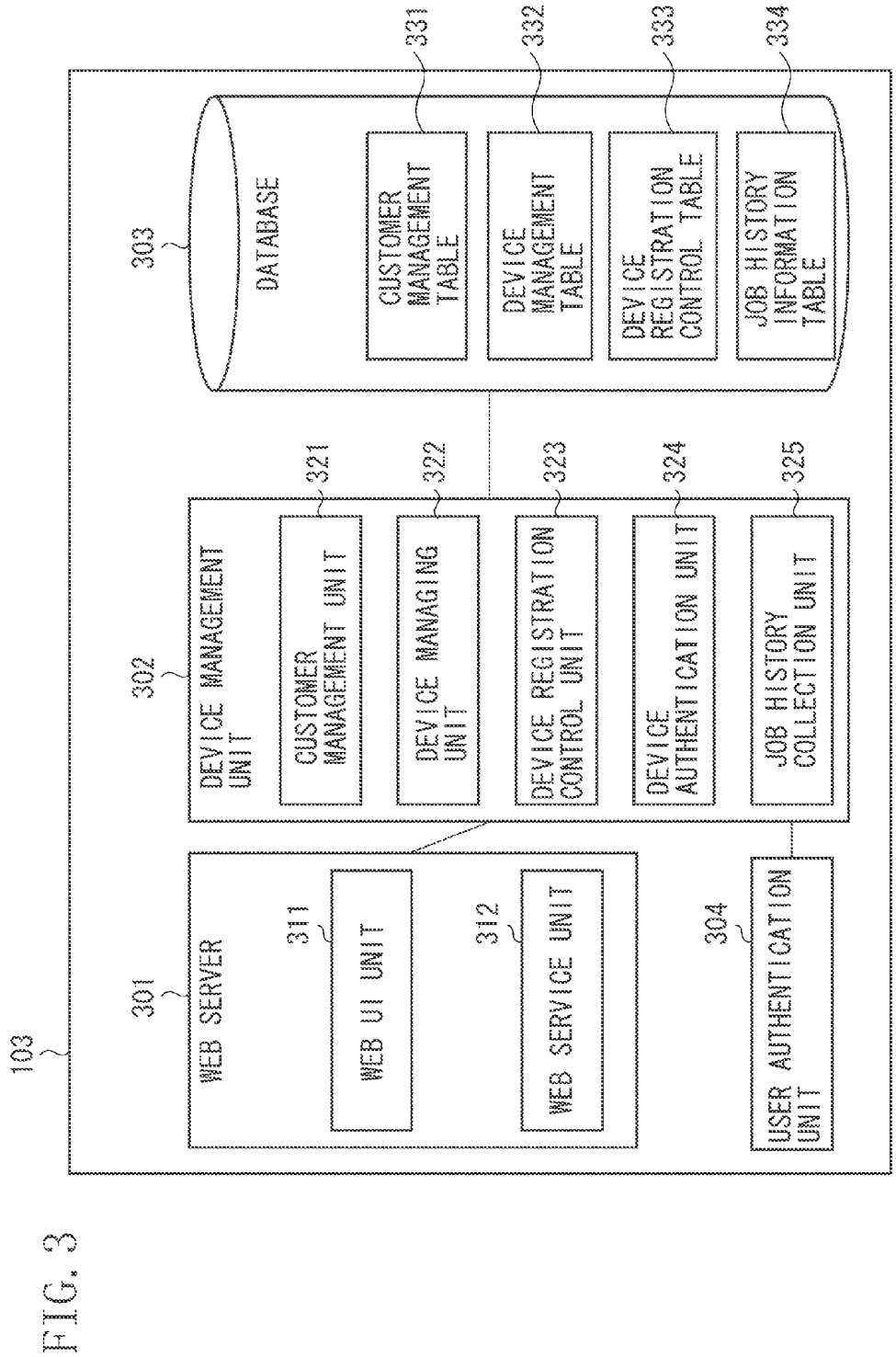
FIG. 3 is a block diagram illustrating a software configuration of the device management server 103.

FIG. 3 is a block diagram illustrating a software configuration of the management server 103.

The management server 103 includes a web server unit 301, a device management unit 302, a database 303, and a user authentication unit 304.

The web server unit 301 receives a request from the terminal 101 and the peripheral device 102, and returns a response to the received request, thereby providing a web service. The web server unit 301 receives a request from the terminal 101 and the peripheral device 102 with use of a protocol such as HyperText Transfer Protocol (HTTP). Further, the web server unit 301 is connected to the terminal 101 and the peripheral device 102 via the NIC 208 and the network 104.

The web server unit 301 includes a web user interface (UI) unit 311 and a web service unit 312. The web UI unit 311 receives a request from a web browser 701 of the terminal 101, and returns data written in HyperText Markup Language (HTML) or the like. The web browser 701 will be described below.

The web service unit 312 receives a request from the peripheral device 102 to the web service, and returns a response to the received request. The device management unit 302 manages for each customer the peripheral device 102 and registration information of the peripheral device 102. More specifically, the registration information refers to information such as a customer identification (ID) with which the peripheral device 102 is registered, the serial No. of the peripheral device 102, an authentication key used when the peripheral device 102 communicates with the management server 103, and the like. The customer ID, the serial No., and the authentication key will be described below. Further, the device management unit 302 collects a history of job(s) carried out by the peripheral device 102, and manages the collected data as a job history.

A customer management unit 321 manages customer information registered with the management server 103. The customer information includes information of a customer name 802, a customer ID 801, a device registration code 803, which will be described below, and the like. The customer management unit 321 obtains the customer information stored in a customer management table 331 in the database 303 according to a request from another control unit. The database 303 and the customer management table 331 will be described below.

A device managing unit 322 manages for each customer the device information of the peripheral device 102 registered with the management server 103. The information of the peripheral device 102 is stored in a device management table 332 in the database 303.

A device registration control unit 323 controls processing for registering the peripheral device 102 with the management server 103. Further, the device registration control unit 323 performs control so as to return an authentication key to the peripheral device 102 when the peripheral device 102 is registered with the management server 103. The authentication key will be described below.

A device authentication unit 324 generates an authentication key used in authentication at the time of communication with the peripheral device 102, for example, when the management server 103 receives the device information such as the job history from the peripheral device 102, and stores the generated authentication key while associating the authentication key with the customer ID and the serial No. The authentication key, the customer ID, and the serial No. are stored in the device management table 332 in the database 303. The device management table 332 will be described below. When the job history is received from the peripheral device 102, the device authentication unit 324 verifies signature information received together with this job history, and stores for each peripheral device 102 the received job history based on the verification result. More specifically, the device authentication unit 324 obtains the serial No. and the signature information added to a header portion of the received job history. The device authentication unit 324 obtains an authentication key associated with the obtained serial No. from the device management table 332, and generates signature information with use of the obtained authentication key.

The device authentication unit 324 verifies whether the generated signature information matches the signature information received together with the job history. If the generated signature information matches the signature information received together with the job history, the device authentication unit 324 authenticates the job history as an unaltered job history from the peripheral device 102 managed by the management server 103. If the generated signature information does not match the signature information received together with the job history, the device authentication unit 324 does not authenticate the job history and does not store the job history in the database 303 by determining that the peripheral device 102 that transmitted the job history is not registered with the management server 103, or the job history is an altered job history.

A customer ID may be added to the header portion, and the device authentication unit 324 may obtain an authentication key associated with the serial No. and the customer ID. Upon reception of the job history from the peripheral device 102, the device authentication unit 324 verifies the signature information, and therefore can prevent the management server 103 from storing information from the peripheral device 102 unregistered with the management server 103, and altered information.

A job history collection unit 325 receives a history of job(s) carried out by the peripheral device 102, and manages the received data as a job history with use of a job history information table 334, which will be described below (a device information reception unit). The job history collection unit 325 receives the job history via the web service unit 312.

The user authentication unit 304 manages information (not illustrated) of a user having an authority to access the management server 103. Further, the user authentication unit 304 verifies user authentication information received from the terminal 101, and authenticates that the user has a right to use the web service if the received authentication information matches the information managed by the user authentication unit 304. The user authentication information refers to, for example, an ID and a password of a user.

The customer management table 331 is a table for managing a customer registered with the management server 103. For example, the customer management table 331 is a table illustrated in FIG. 8A. A customer is managed by being associated with the customer ID 801, the customer name 802, and the device registration code 803. The customer ID 801 is customer identification information for identifying the customer within the management server 103. The customer name 802 is the customer's name used when the customer is displayed on a web browser or the like. The device registration code 803 is a value that allows the customer to be uniquely identified. For example, information pieces of a customer name "AA Inc." and a device registration code "123456" are associated with a customer ID "AA123". The customer registered with the customer management table 331 is registered while being associated with a user. If a user is successfully authenticated by the above-described user authentication unit 304, the information of the customer registered while being associated with that user is transmitted to the customer management unit 321 according to a request from the customer management unit 321.

The device management table 332 is a table for managing the peripheral device 102 registered with the management server 103. For example, the device management table 332 is a table illustrated in FIG. 8B. The peripheral device 102 is managed while being associated with a customer ID 811, a serial No. 812, and an authentication key 813. The customer ID 811 is an ID for identifying a customer, and is associated with the customer ID 801 managed in the customer management table 331. The serial number 812 is individual identification information for identifying the peripheral device 102. The authentication key 813 is a key for a signature for authenticating the peripheral device 102 managed by the management server 103. For example, the peripheral device 102 having the serial number 812 "QWE1234" is registered with the customer having the customer ID 811 "AA123", and the authentication key 813 thereof is "1qazxsw2". When the peripheral device 102 having the serial No. 812 "QWE1234" communicates with the management server 103, the authentication key 813 "1qazxsw2" is used.

A device registration control table 333 is a table for temporarily managing an authentication key for returning the authentication key to the peripheral device 102 when the peripheral device 102 is registered with the management server 103. For example, the device registration control table 333 is a table illustrated in FIG. 8C. An authentication key obtaining ID 821 is an ID issued by the peripheral device 102 to obtain an authentication key 824. A serial No. 822 is a serial No. for identifying the peripheral device 102. A customer ID 823 is an ID for identifying a customer, and is associated with the customer ID 801 managed in the customer management table 331 and the customer ID 811 managed in the device management table 332. The authentication key 824 is a key for a signature for authenticating the peripheral device 102 managed by the management server 103. An obtainable deadline 825 indicates a deadline until which the authentication key 824 can be obtained with use of the authentication key obtaining ID 821. For example, if the peripheral device 102 having the serial No. 822 "QWE1234" is registered with the customer having the customer ID 823 "AA123", the authentication key 824 is "1qazxsw2". Then, the device registration control table 333 indicates that the authentication key obtaining ID 821 for obtaining this authentication key 824 is "zse45tfc", and the authentication key 824 can be obtained with use of the authentication key obtaining ID 821 until the deadline "Jul. 1, 2012, 12:00".

A job history information table 334 is a table for managing a history of job(s) carried out by the peripheral device 102. For example, the job history information table 334 is a table illustrated in FIG. 8D. A customer ID 831 is an ID for identifying a customer. A serial No. 832 is a serial No. for identifying the peripheral device 102. A job type 833 is, for example, printing data from a host computer, copying, scanning, faxing, and box printing a document stored in the peripheral device 102. A start time 834 and an end time 835 are a start time and an end time of a job carried out by the peripheral device 102 corresponding to the serial No. 832. The number of page(s) processed by relevant job is recorded in a number of page(s) 836. A document name 837 is a document name set by a print application to relevant job.

A job history information table held by a job history management unit 505 of the peripheral device 102 has the table structure illustrated in FIG. 8D with the customer ID 831 and the serial No. 832 removed therefrom.

Figure 4:
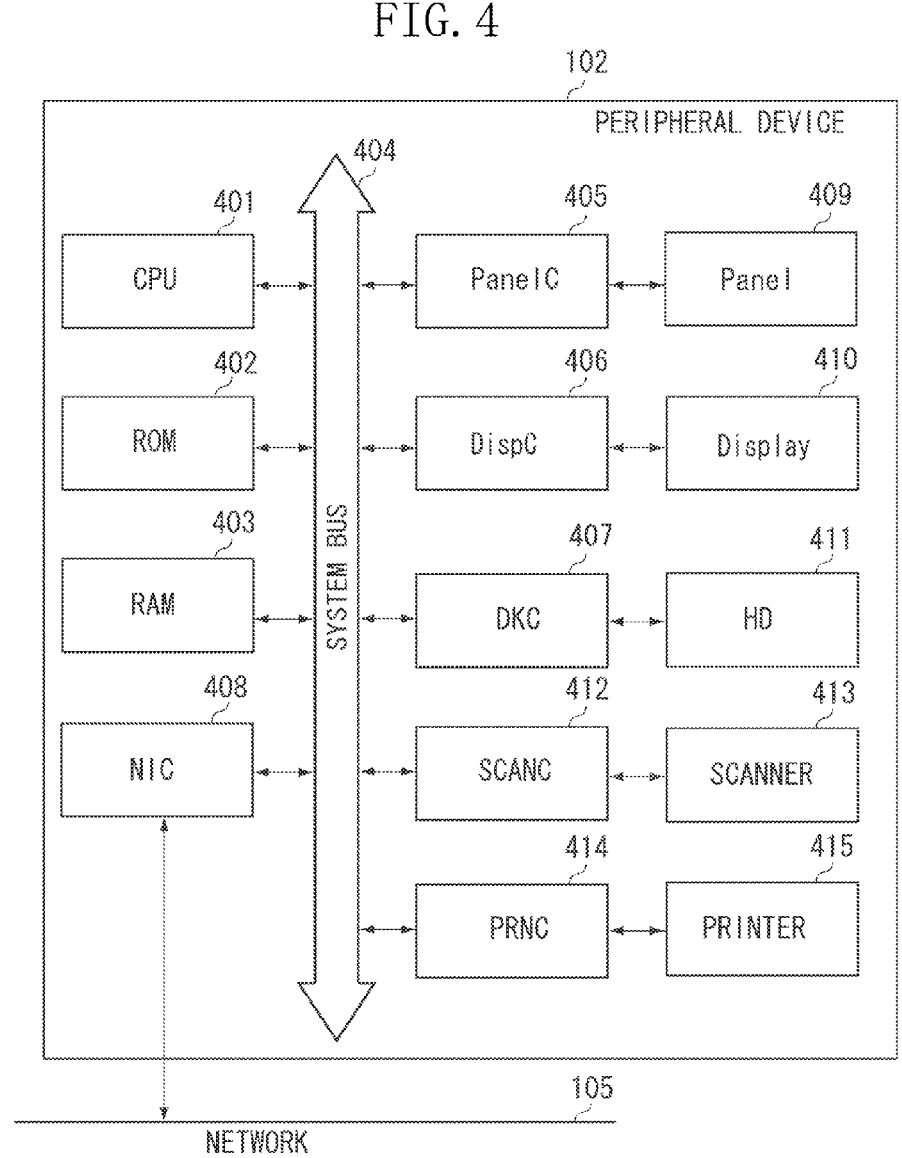
FIG. 4 is a block diagram illustrating a hardware configuration of a peripheral device 102.

FIG. 4 is a block diagram illustrating a hardware configuration of the peripheral device 102.

A CPU 401 is a controller that executes a program, controls various kinds of processing of the peripheral device 102, and controls respective components connected to a system bus 404. The CPU 201 loads software stored in a ROM 402 or a hard disk (HD) 411, which is a mass storage device, to a RAM 403, and executes the loaded software. The ROM 402 is a data read only memory, and stores a basic control program of the system. The RAM 403 is a data read and write memory, and is used for various kinds of calculation processing by the CPU 401 and a temporary data storage. A panel controller (PanelC) 405 controls an instruction inputting from an operation panel (Panel) 409 provided to the peripheral device 102. A display controller (DispC) 406 controls a display of a display unit (Display) 410 constituted by, for example, a liquid crystal display device. A disk controller (DKC) 407 controls the hard disk (HD) 411, which is a mass storage device. A network interface card (NIC) 408 controls communication with another device connected to the network 104. The HD 411 stores a system program of an operating system and an application program of the peripheral device 102, and is also used as, for example, a temporary storage area during data processing. If an embedded application is installable in the peripheral device 102, the embedded application is stored in the HD 411. Further, the HDD 411 stores the job history of the peripheral device 102, and the like. A scanner controller (SCANC) 412 controls an optical scanner 413 provided to the peripheral device 102 to read a paper document. A printer controller (PRNC) 414 controls a printer 415 provided to the peripheral device 102 to print data on a sheet using a known print technique such as the electrophotographic technique or the inkjet technique.

These devices are connected to the system bus 404.

FIG. 13 illustrates an example of a user interface (UI) provided by a UI control unit 502. The UI is displayed on the Panel 409 or the Display 410.

A key input unit 1300 is provided at the peripheral device 102, and can receive a user's operation via hardware keys. A power switch 1301 is an ON/OFF button, and is a power switch of the peripheral device 102. A start key 1303 instructs the peripheral device 102 to start processing provided by the peripheral device 102 such as copying, printing, scanning, fax transmission, and the like. A numeric keypad 1304 receives a user's input of numerical information. An ID key 1305 is used to instruct the peripheral device 102 to input authentication information. A clear key 1306 cancels information input via the numeric keypad 1304. A reset key 1307 returns a screen displayed on a display screen 1302 to an initial screen such as a menu screen 1401. The menu screen 1401 will be described below. The display screen 1302 has a function of displaying the menu screen 1401. Further, if the display screen 1302 has a touch panel function, not only the display screen 1302 has the function of displaying the menu screen 1401 but also the display screen 1302 can receive an input from a user by detecting whether a displayed area is pressed. A Quick Response (QR) code (registered trademark) 1310 is generated by a QR code (registered trademark) generation unit 511, which will be described below, and is displayed on the display screen 1302 by the UI control unit 502. An input from a user can be received by displaying the respective elements illustrated in FIG. 13 on the Panel 409 or the Display 410 having the touch panel function, and detecting whether the respective displayed elements are pressed.

Figure 5:
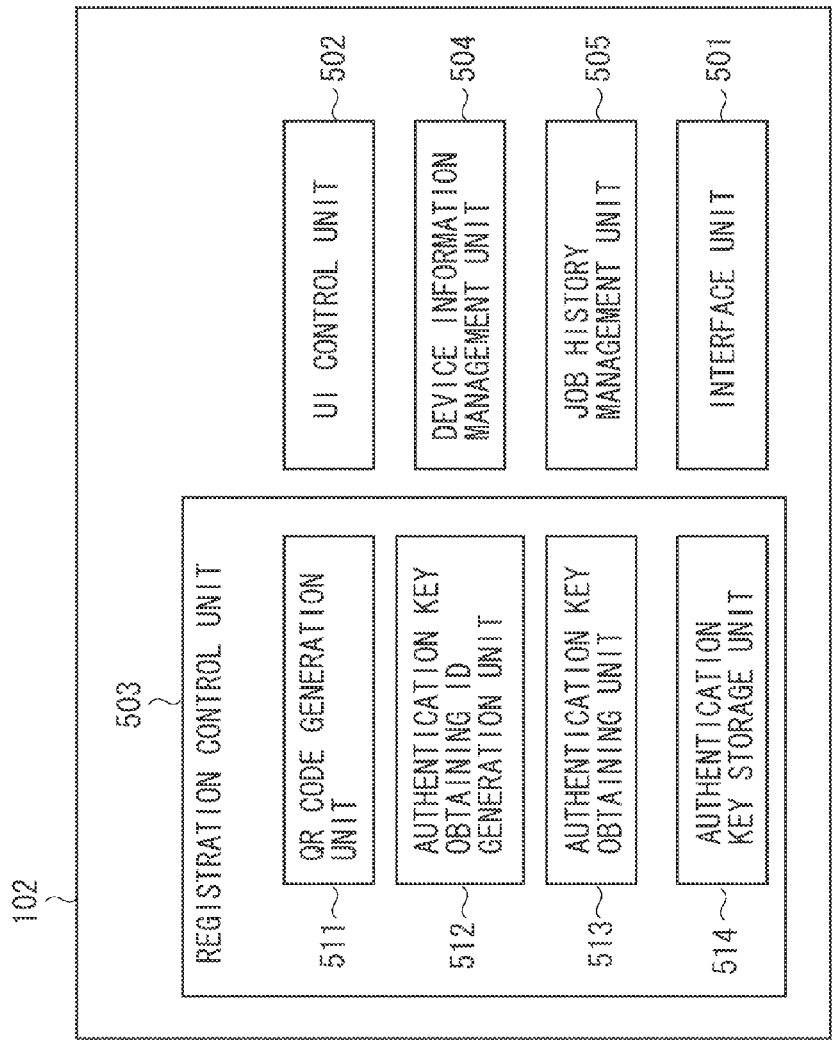
FIG. 5 is a block diagram illustrating a software configuration of the peripheral device 102.

FIG. 5 is a block diagram illustrating a software configuration of the peripheral device 102.

An interface unit 501 is connected to the network 104, and receives a print job from a host computer (not illustrated). Further, the interface unit 501 communicates with the management server 103.

The UI control unit 502 controls the Display 410 via the DispC 406, and displays a screen for receiving a user's instruction to copy data, and a user's instruction to display information to be registered to the management server 103. Further, the UI control unit 502 controls the Panel 409 via the PanelC 405, and receives a user's instruction to copy data to the peripheral device 102, and a user's instruction to display information to be registered with the management server 103. Upon reception of the instruction to display information to be registered with the management server 103, the UI control unit 502 notifies a registration control unit 503 of the reception of the registration information display instruction. Further, upon reception of the notification, the UI control unit 502 displays the QR cord (registered trademark) 1310 generated by the QR code (registered trademark) generation unit 511 of the registration control unit 503 which has received the notification, on the Panel 409 or the Display 410.

The registration control unit 503 controls registration of the peripheral device 102 with the management server 103.

An authentication key obtaining ID generation unit 512 generates an authentication key obtaining ID for obtaining the authentication key when the peripheral device 102 is registered with the management server 103. The authentication key is a signature key for authenticating the peripheral device 102 when the peripheral device 102 communicates with the management server 103. The authentication key is generated for each peripheral device 102 by the management server 103, and is transmitted to the peripheral device 102. Once the peripheral device 102 obtains the authentication key after succeeding in registration with the management server 103, the peripheral device 102 generates signature data with use of the authentication key and transmits communication data with the signature data and the serial No. for identifying the peripheral device 102 attached thereto, when communicating with the management server 103 thereafter. Upon reception of the communication from the peripheral device 102, the management server 103 generates signature data with use of the authentication key of the corresponding peripheral device 102, and determines that the communication data is successfully authenticated if the generated signature data matches the attached signature data.

A device information management unit 504 manages setting information and configuration information of the peripheral device 102, and returns specified information in response to an information obtaining request from another component. Examples of types of information managed by the device information management unit 504 include the serial No. of the peripheral device 102 and the like.

The QR code (registered trademark) generation unit 511 generates the QR code (registered trademark) 1310 by encoding (1) the Uniform Resource Locator (URL) of the management server 103 (the address of the management server 103), (2) the authentication key obtaining ID, and (3) the serial No. of the peripheral device 102 (an image information generation unit). The QR code (registered trademark) generation unit 511 incorporates the items (2) and (3) as parameters of the URL of the item (1) as added information. Further, the QR code (registered trademark) generation unit 511 outputs the generated image information. The output method is, for example, displaying the image information on the Display 410 or the Panel 409 via the UI control unit 502, or printing the image information by the printer 415.

An authentication key obtaining unit 513 (an obtaining request transmission unit) receives an instruction from the registration control unit 503, and issues and authentication key obtaining request to the management server 103. The authentication key obtaining unit 513 transmits the authentication key obtaining ID together with the authentication key obtaining request, and stores the authentication key returned as a response thereto in an authentication key storage unit 514.

The authentication key storage unit 514 stores the authentication key obtained by the authentication key obtaining unit 513 (authentication key reception).

A job history management unit 505 stores a history of job(s) carried out by the peripheral device 102, and periodically transmits the job history to the management server 103 via the interface unit 501 (a device information transmission unit). When transmitting the job history, the job history management unit 505 obtains the authentication key from the authentication key storage unit 514, generates signature information with use of the obtained authentication key (a signature information generation unit), and adds the generated information to a header together with the customer ID and the serial No. As the method for generating the signature information, the job history management unit 505 uses Secure Hash Algorism (SHA) or another algorism.

FIG. 6 is a block diagram illustrating a hardware configuration of the terminal 101.

A CPU 601 is a controller that executes a program, controls various kinds of processing, and controls respective components connected to a system bus 604. The CPU 601 loads software stored in a ROM 602 or an HD 611 to a RAM 603, and executes the loaded software. The ROM 602 is a data read only memory, and stores a basic control program of the system. The RAM 603 is a data read and write memory, and is used for various kinds of calculation processing by the CPU 601 and a temporary data storage. An input device (INPUT) 605 is a touch panel, a button, and/or the like, and provides an input method to a user. A display unit (Display) 606 is a display unit constituted by a liquid crystal display device or the like. A network interface card (NIC) 607 controls communication with another device connected to the network 104. A camera (CAM) 608 is a camera that provides a shooting function, and has a function of reading a QR code (registered trademark). The HD 611 stores a system program of an operating system and the like of the terminal 101, and is also used as, for example, a temporary storage area during data processing.

FIG. 7 is a block diagram illustrating a software configuration of the terminal 101.

The terminal 101 includes the web browser 701, a communication unit 702, a QR code (registered trademark) reading unit 703, and a QR code (registered trademark) decoding unit 731 that has a function of decoding a QR code (registered trademark).

The web browser 701 specifies a URL, transmits an information obtaining request to the communication unit 702, and obtains web page data. The web browser 701 displays a screen on the Display 606 based on the web page data obtained via the communication unit 702. Further, the web browser 701 receives a user's operation applied to a control in the displayed screen via the input device 605, and transmits a request according to the operation content to the communication unit 702.

The communication unit 702, for example, receives a communication request from the web browser 701, communicates with a web server via the peripheral device 102 and the like, and the NIC 607 with use of a protocol such as HTTP, requests a web page, and receives web page data. In the present exemplary embodiment, the communication unit 702 communicates with the management server 103.

The QR code (registered trademark) reading unit 703 controls the camera 608 to shoot the QR code (registered trademark) 1310, thereby generating image data. Subsequently, the QR code (registered trademark) reading unit 703 instructs the QR code (registered trademark) decoding unit 731 to analyze the image of the QR code (registered trademark)

1310 shot by the camera 608 to decode the QR code (registered trademark) 1310, thereby obtaining the URL information encoded in the QR code (registered trademark) 1310. Further, the QR code (registered trademark) reading unit 703 displays the obtained URL information on the Display 606.

A user selects the URL and instructs the terminal 101 to execute it, by which the web browser 701 is activated to access the web server (the management server 103) indicated by the obtained URL.

FIG. 9 is a flowchart illustrating a flow of the image information display processing and the authentication key reception processing, which are processed in the peripheral device 102. The CPU 401 reads out the application program stored in the HD 411, and performs the following steps.

In step S901, the UI control unit 502 of the peripheral device 102 displays a menu screen 1401 on the Display 410 (the display screen 1302). To allow a user to select usable functions of the peripheral device 102 such as copying, and a display of registration information screen 1402, which indicates the registration information of the peripheral device 102, the respective menu buttons therefor are displayed on the menu screen 1401. The UI control unit 502 displays these menu buttons on the display screen 1302, and the user selects any of the displayed buttons to thereby instructs the peripheral device 102 to shift to a screen indicated by each button. Upon reception of a selection of any menu button, the UI control unit 502 calls up an application corresponding to the selected menu button or the control unit. The menu screen may be displayed on the Panel 409.

In step S902, the user selects the menu button of DISPLAY REGISTRATION INFORMATION 1402. The UI control unit 502 calls up the registration control unit 503 in response to the user's selection instruction of the menu button.

In step S903, the registration control unit 503 obtains the serial No. of the peripheral device 102 from the device information management unit 504.

In step S904, the authentication key obtaining ID generation unit 512 receives an instruction from the registration control unit 503, and generates an authentication key obtaining ID.

In step S905, the registration control unit 503 generates the QR code (registered trademark) 1310 by transmitting a character string formed by combining the URL of the management server 103, the serial No. obtained in step S903, and the authentication key obtaining ID generated in step S904 to the QR code (registered trademark) generation unit 511.

In step S906, the registration control unit 503 displays an image of the generated QR code (registered trademark) 1310 on the Display 410 (the display screen 1302) via the UI control unit 502. At this time, the QR code (registered trademark) 1310 may be displayed on the Panel 409.

In step S907, the UI control unit 502 determines whether a predetermined time has elapsed from the display of the QR code (registered trademark) 1310 in step S906 or whether the clear button 1307 is pressed by the user. The predetermined time may be a time determined in advance, or may be determined by the user when the QR code (registered trademark) 1310 is generated. If the UI control unit 502 determines that the predetermined time has elapsed or the clear button 1307 is pressed (YES in step S907), the processing proceeds to step S901, and the UI control unit 502 displays the menu screen 1401 on the Display 410 again. If the UI control unit 502 determines that the predetermined period of time has not elapsed yet and the clear button 1307 is not pressed (NO in step S907), the processing proceeds to step S908.

In step S908, the authentication key obtaining unit 513 transmits an authentication key obtaining request to the management server 103 via the interface unit 501. At this time, as the protocol, the authentication key obtaining unit 513 may use HyperText Transfer Protocol Secure (HTTPS), Simple Object Access Protocol (SOAP), Representational State Transfer (REST), or the like. When transmitting the authentication key obtaining request, the authentication key obtaining unit 513 specifies the authentication key obtaining ID generated in step S904 and the serial No. obtained in step S903 as parameters. Processing performed when the management server 103 receives the authentication key obtaining request will be described below.

In step S909, the authentication key acquisition unit 513 receives a response to the authentication key obtaining request, and determines whether the authentication key is successfully obtained. If the authentication key obtaining unit 513 determines that the authentication key is successfully obtained (YES in step S909), the processing proceeds to step S910. If the authentication key acquisition unit 513 determines that the authentication key is not successfully obtained (No in step S909), the processing proceeds to step S907 again. The authentication key obtaining unit 513 repeats the authentication key obtaining request until the authentication key is returned from the management server 103 or the clear button 1307 is pressed by the user.

In step S910, the authentication key obtaining unit 513 stores the authentication key and the customer ID obtained from the management server 103 in the authentication key storage unit 514, and then the processing ends.

Figure 10:
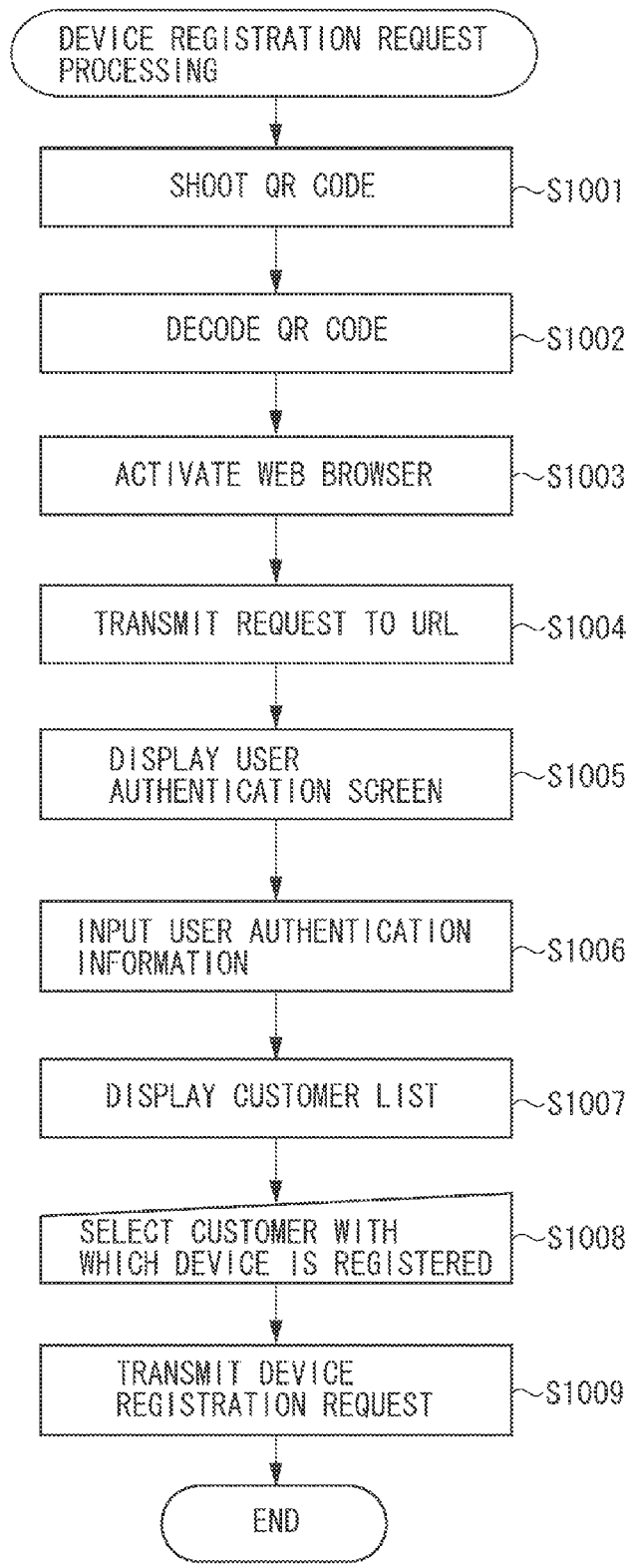
FIG. 10 is a flowchart illustrating a flow of device registration request processing, which is processed in the mobile terminal 101.

FIG. 10 illustrates a flow of device registration request processing, which is processed in the terminal 101. The CPU 601 reads out the basic control program of the system stored in the ROM 602, and performs the following steps.

In step S1001, a user causes the QR code (registered trademark) reading unit 703 of the terminal 101 to shoot the QR code (registered trademark) 1310 displayed on the Display 410 (the display screen 1302) of the peripheral device 102 by the camera 608, and then generate image data.

In step S1002, the QR code (registered trademark) reading unit 703 decodes the image data generated in step S1001 by the QR code (registered trademark) decoding unit 731 to obtain the URL. The URL indicates the URL of the management server 103, and the authentication key obtaining ID generated by the peripheral device 102 and the serial No. of the peripheral device 102 are incorporated in parameters of the URL as additional information.

In step S1003, the user activates the web browser 701.

In step S1004, the web browser 701 transmits via the communication unit 702 a web page obtaining request to the management server 103 indicated by the URL obtained from the QR code (registered trademark) 1310. Upon reception of the web page obtaining request, the web server 301 of the management server 103 generates an authentication screen by the web UI unit 311, and transmits the generated authentication screen to the terminal 101.

In step S1005, the web browser 701 receives an authentication screen 1411 transmitted from the management server 103, and displays the received authentication screen 1411 on the Display 606.

In step S1006, the user inputs from the INPUT 605 user authentication information on the authentication screen 1411 displayed in step S1005. The web browser 701 receives an input instruction from the user, and transmits the user authentication information to the management server 103. For example, the input user authentication information refers to an ID 1412 and a Password 1413 of the user. The user authentication unit 304 of the management server 103 verifies the received user authentication information, and authenticates that the user has a right to use the web service if the received user authentication information matches the user information managed by the user authentication unit 304. If the user is successfully authenticated, the customer management unit 321 obtains customer information (the customer IDs 801, the customer names 802, and the device registration codes 803) of customers managed by that user from the customer management table 331. The customer management unit 321 returns the obtained customer information to the web browser 701 via the web UI unit 311. If the user cannot be successfully authenticated, the user inputs user authentication information on the authentication screen 1411 again, and user authentication is carried out.

In step S1007, the web browser 701 analyses the received customer information, and displays a customer selection screen 1421. Customers 1422 that own the peripheral devices 102 managed by the user are displayed on the customer selection screen 1421. Information obtainable from the customer management unit 321 can be displayed on the customer selection screen 1421, and not only the customer names 802 but also the customer IDs 801 and the device registration codes 803 may be displayed on the customer selection screen 1421.

In step S1008, the user selects the customer name of a customer of a registration destination with which the peripheral device 102 is to be registered from the customers 1422 on the customer selection screen 1421 displayed in step S1007.

In step S1009, the web browser 701 transmits a device registration request to the management server 103 via the HTTP communication unit 702 together with the customer information (the customer ID) of the customer 1422 selected in step S1008 and the authentication key obtaining ID (an obtaining ID transmission unit), and then the processing ends.

Figure 11:
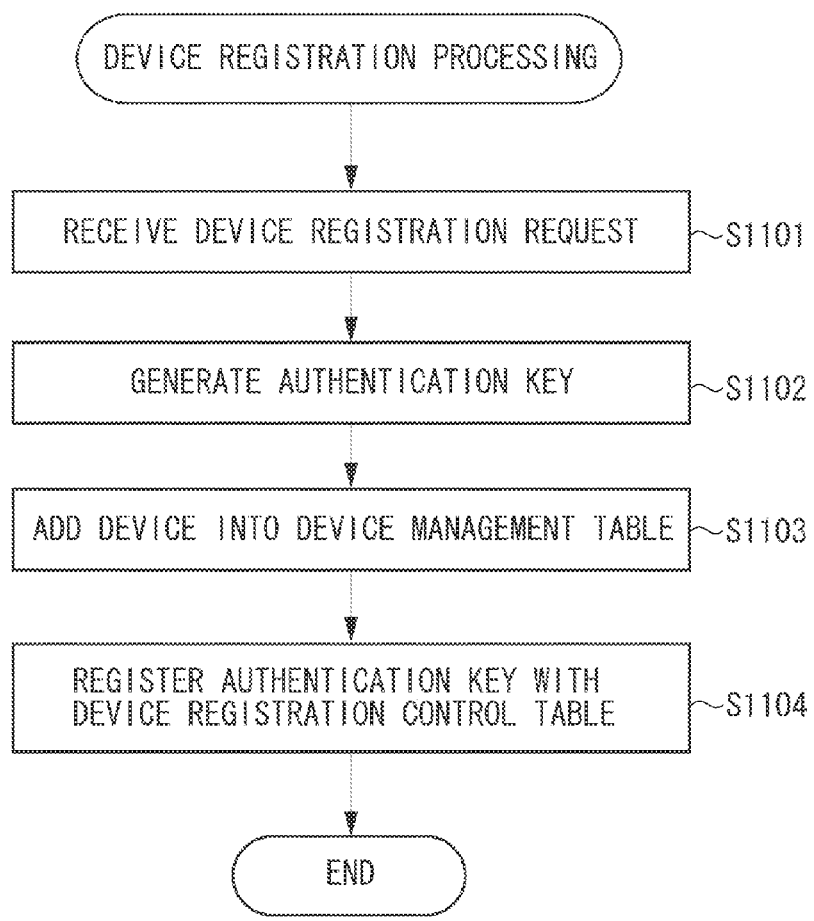
FIG. 11 is a flowchart illustrating a flow of device registration processing, which is processed in the device management server 103.

FIG. 11 illustrates a flow of the device registration processing, which is processed in the management server 103 upon reception of the device registration request. The CPU 201 reads out the application program stored in the HD 211, and performs the following steps.

In step S1101, the web UI unit 311 of the management server 103 receives the device registration request from the terminal 101 (an obtaining ID reception unit). The device registration request contains the customer information of the customer 1422 selected by the user on the customer selection screen 1421. The authentication key obtaining ID and the serial No. are held in session information.

In step S1102, upon reception of the device registration request in step S1101, the web UI unit 311 instructs the device authentication unit 324 to generate an authentication key. The device authentication unit 324 generates an authentication key of the device for which the user has issued the registration request, in response to the instruction from the web UI unit 311.

In step S1103, the device authentication unit 324 registers the customer ID and the serial No. contained in the customer information, and the authentication key generated in step S1102 in the device management table 332 while associating them. The customer ID and the serial No. may be registered with the management server 103 in advance. If the customer ID and the serial No. are registered with the management server 103 in advance, the device authentication unit 324 registers the generated authentication key while associating it with the registered customer ID and serial No.

In step S1104, the device registration control unit 323 registers the authentication key obtaining ID, the serial No., the customer ID received in step S1101, the authentication key generated in step S1102, and a deadline until which the authentication key can be obtained with the device registration control table 333. The deadline until which the authentication key can be obtained is set to a time calculated by adding a predetermined time to a processing time.

Figure 12:
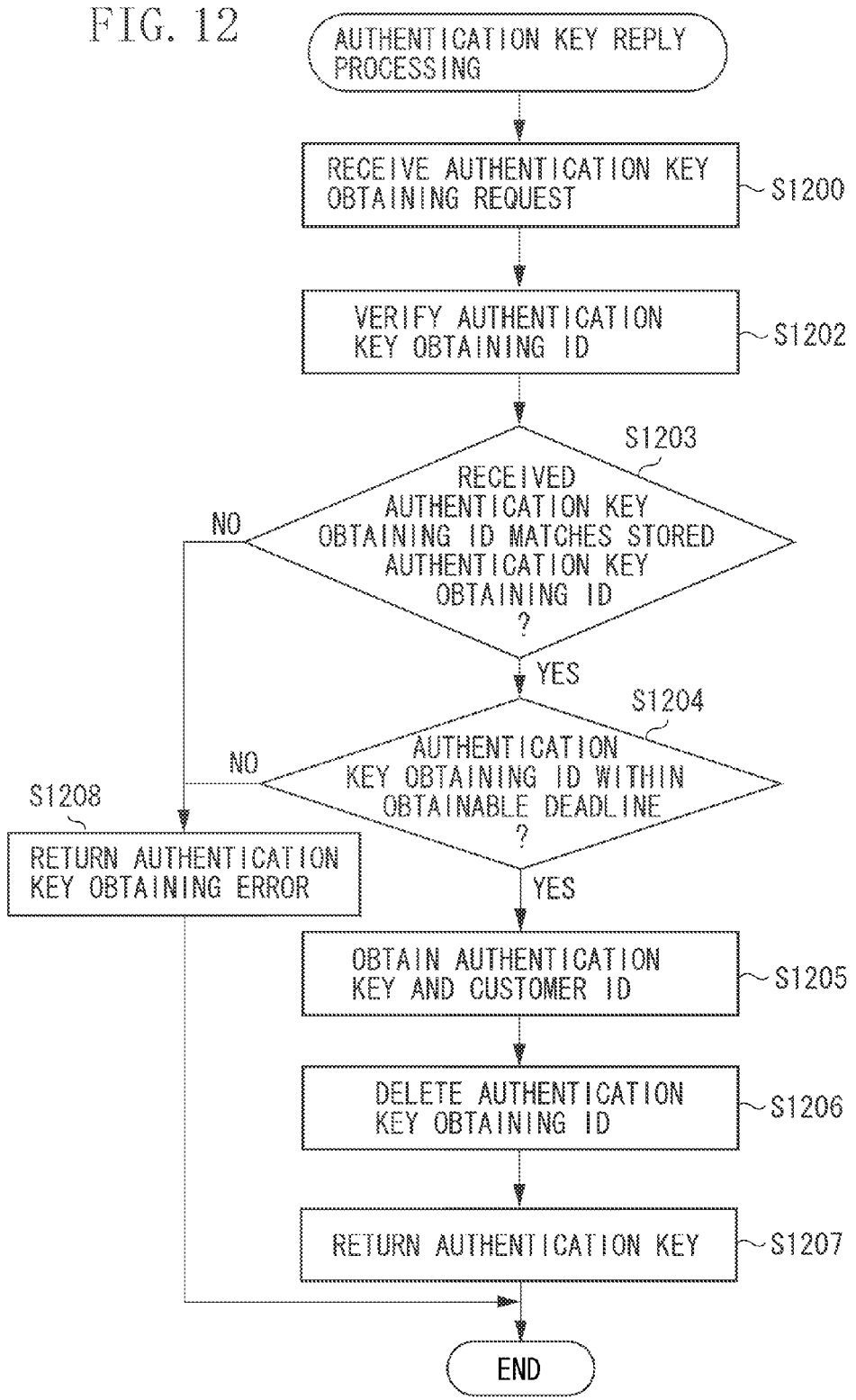
FIG. 12 is a flowchart illustrating a flow of authentication key return processing, which is processed in the device management server 103, according to a first exemplary embodiment.

FIG. 12 illustrates a flow of the authentication key reply processing, which is processed in the management server 103 upon reception of the authentication key obtaining request from the peripheral device 102 (S908). The CPU 201 reads out the application program stored in the HD 211, and performs the following steps.

In step S1201, the web service unit 312 receives the authentication key obtaining request from the peripheral device 102 (an obtaining request reception unit). The web service unit 312 receives the authentication key obtaining ID generated in step S904 and the serial No. obtained in step S903, together with the authentication key obtaining request.

In step S1202, the web service unit 312 searches from the device registration control table 333 for the authentication key obtaining ID registered while being associated with the serial No. received in step S1201.

In step S1203, the device registration control unit 323 determines whether the authentication key obtaining ID 821 searched for and obtained in step S1202 matches the authentication key obtaining ID received in step S1201. The device registration control unit 323 returns the authentication key to the peripheral device 102 based on the determination result. If the device registration control unit 323 determines that the authentication key obtaining ID 821 searched for and acquired in step S1202 matches the authentication key obtaining ID received in step S1201 (YES in step S1203), the processing proceeds to step S1204. If the device registration control unit 323 determines that there is no corresponding customer (NO in step S1203), the processing proceeds to step S1208.

In step S1204, the device registration control unit 323 determines whether the current time is within the deadline until which the authentication key 824 can be obtained with use of the authentication key obtaining ID 821 (the obtainable deadline 825). If the device registration control unit 323 determines that the current time is within the obtainable deadline 825 (YES in step S1204), the processing proceeds to step S1205. If the device registration control unit 323 determines that the current time is not within the obtainable deadline 825 (NO in step S1204), the processing proceeds to step S1208.

In step S1205, the device registration control unit 323 obtains the corresponding authentication key 824 and customer ID 823 from the device registration control table 333.

In step S1206, the device registration control unit 323 deletes the authentication key obtaining ID 821 together with the corresponding customer's row from the device registration control table 333.

In step S1207, the device registration control unit 323 returns the authentication key determined as a match in step S1203 and the customer ID to the peripheral device 102, as a response to the authentication key obtaining request, and then the processing ends. The reply is performed via the web UI unit 311. Processing performed by the peripheral device 102 upon reception of the authentication key and the customer ID corresponds to the process in step S910 illustrated in FIG. 9. The information returned from the management server 103 to the peripheral device 102 may be only the authentication key.

In step S1208, the device registration control unit 323 returns information indicating an error in obtaining the authentication key to the peripheral device 102 via the web UI unit 311.

The processes in step S1201 to step S1208 are performed during one session.

After that, when the peripheral device 102 transmits the device information to the management server 103, the authentication key storage unit 514 encodes the device information with use of the authentication key returned from the management server 103 to generate signature information, and transmits the signature information, the customer ID, and the serial No. together with the device information. The information transmitted together with the device information may be the signature information and the serial No.

Upon reception of a communication request, the management server 103 receives the signature information and the serial No. together with the communication request. The device authentication unit 324 generates signature information with use of the authentication key stored in the device management table 332 together with the received serial No. If the received signature information matches the signature information generated by the device authentication unit 324, the management server 103 authenticates this peripheral device 102, and manages the received device information while associating it with the serial No.

In this manner, according to the first exemplary embodiment, when the peripheral device 102 is registered with the management server 103, the user can perform the operation for specifying and registering the customer of registration destination without using the customer's network to which the peripheral device 102 is connected. Further, if the peripheral device 102 has limited operability for the Panel 409 and the Display 410 of the peripheral device 102, the user can register the peripheral device 102 from the terminal 101.

A second exemplary embodiment will be described.

According to the second exemplary embodiment, the peripheral device 102 does not include the Panel 409 and the Display 410, and therefore cannot display a two-dimensional bar code such as a QR code (registered trademark), and this peripheral device 102 is registered with the management server 103. The method therefor will be described now.

Figure 15:
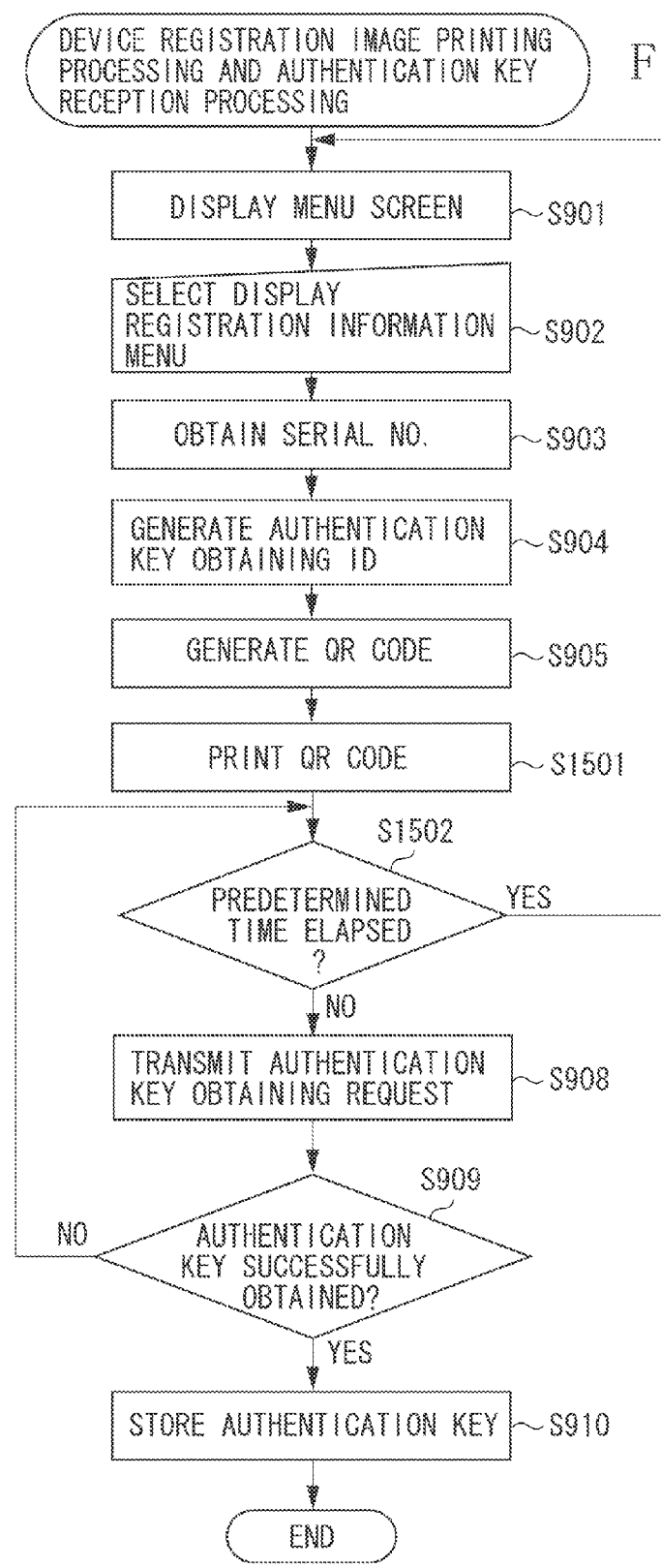
FIG. 15 is a flowchart illustrating a flow of image information print processing and authentication key reception processing, which are processed in the peripheral device 102, according to a second exemplary embodiment.

FIG. 15 illustrates a flow of the image information printing processing and the authentication key obtaining processing, which are processed in the peripheral device 102. In the following description, similar processes to the processes according to the first exemplary embodiment illustrated in FIG. 9 will be identified by the same reference numerals, and descriptions thereof will be omitted. In the following description, only differences from the first exemplary embodiment will be described. The CPU 401 reads out the application program stored in the HD 411, and performs the following steps.

From step S901 to step S905, the peripheral device 102 performs similar processes to the device registration screen display processing, which is processed by the peripheral device 102 according to the first exemplary embodiment.

Upon completion of the process in step S905, in step S1501, the printer 415 of the peripheral device 102 prints the QR code (registered trademark) 1310 generated in step S905. More specifically, the QR code (registered trademark) 1310, which is displayed on the display screen 1302 according to the first exemplary embodiment, is printed on a document sheet.

In step S1502, the UI control unit 502 determines whether a predetermined time has elapsed from the printing of the QR code (registered trademark) 1310. The predetermined time may be a time determined in advance, or may be determined by the user when the QR code (registered trademark) 1310 is printed. If the UI control unit 502 determines that the predetermined time has elapsed (YES in step S1502), the processing proceeds to step S901, and the peripheral device 102 displays the menu screen. If the UI control unit 502 determines that the predetermined time has not elapsed yet (NO in step S1502), the processing proceeds to step S908. From step S908 to step S910, the peripheral device 102 performs similar processes to the processes according to the first exemplary embodiment, and then the processing for printing the image information ends. However, if the peripheral device 102 fails in obtaining the authentication key in step S909 (NO in step S909), the processing proceeds to step S1502, and the subsequent steps are performed.

As the device registration processing by the terminal 101, the terminal 101 performs similar processing to the processing according to the first exemplary embodiment illustrated in FIG. 10. However, in step S1001, the terminal 101 shoots the QR code (registered trademark) 1310 printed in step S1501. Further, as the device registration processing by the management server 103, the management server 103 also performs similar processing to the processing according to the first exemplary embodiment.

According to the second exemplary embodiment, the QR code (registered trademark) 1310 is printed on a document sheet, whereby it is possible to realize the device registration processing with use of the terminal 101 in a similar manner to the first exemplary embodiment, even if the peripheral device 102 does not include the Panel 409 and the Display 410 for displaying the QR code (registered trademark) 1310.

A third exemplary embodiment will be described.

As the third exemplary embodiment, a method for registering the device with use of the Panel 409 or the Display 410 of the peripheral device 102 will be described.

According to the third exemplary embodiment, the device registration processing is performed with use of the device registration code 803, instead of the QR code (registered trademark) 1310. The device registration code 803 is stored in the customer management table 331 of the database 303.

FIG. 16 illustrates a flow of obtaining processing for the device registration code 803, which is processed in the terminal 110. The CPU 601 reads out the basic control program of the system stored in the ROM 602, and performs the following steps.

In step S1601, a user activates the web browser 701 of the terminal 101.

In step S1602, the web browser 701 transmits a web page obtaining request to the management server 103 via the communication unit 702. Upon reception of the web page obtaining request, the web server 301 of the management server 103 generates the authentication screen 1411 by the web UI unit 311, and returns the generated authentication screen 1411 to the terminal 101.

In step S1603, the web browser 701 displays the received authentication screen 1411 on the Display 606.

In step S1604, the user inputs from the INPUT 605 user authentication information on the authentication screen 1411 displayed in step S1603. The web browser 701 receives an input instruction issued by the user, and transmits the user authentication information to the management server 103. When receiving the user authentication information, the user authentication unit 304 of the management server 103 performs a similar process to the process in step S1006 illustrated in FIG. 10. If the user is successfully authenticated, the customer management unit 321 obtains customer information of customers managed by this user from the customer management table 331. The customer management unit 321 returns the obtained customer information to the web browser 701 via the web UI unit 311.

In step S1605, the web browser 701 analyzes the received customer information, and displays the customer selection screen 1421. The customer information displayed at this time is the customer names 802 and the device registration codes 803. Further, the customer IDs 801 may be displayed together with the customer names 802 and the device registration codes 803. After the web browser 701 receives the customer information and displays the customer information including the device registration codes 803 on the DISPLAY 606, the obtaining processing for the device registration code 803 ends.

Figure 14A:
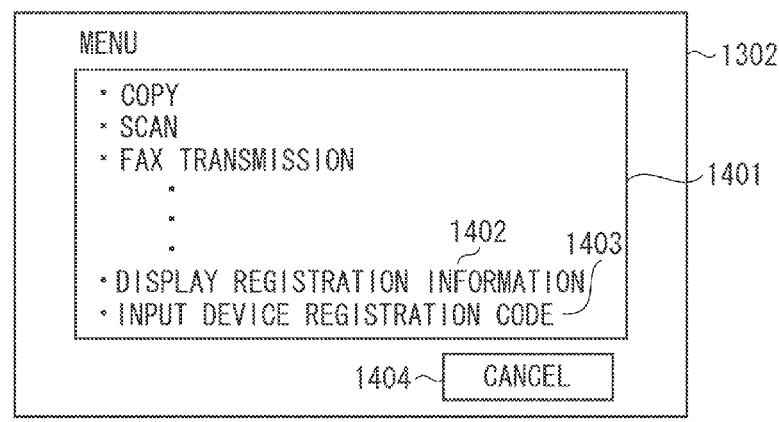
FIG. 14A illustrates an example of a menu screen displayed on a display screen 1302 of the peripheral device 102.
Figure 14B:
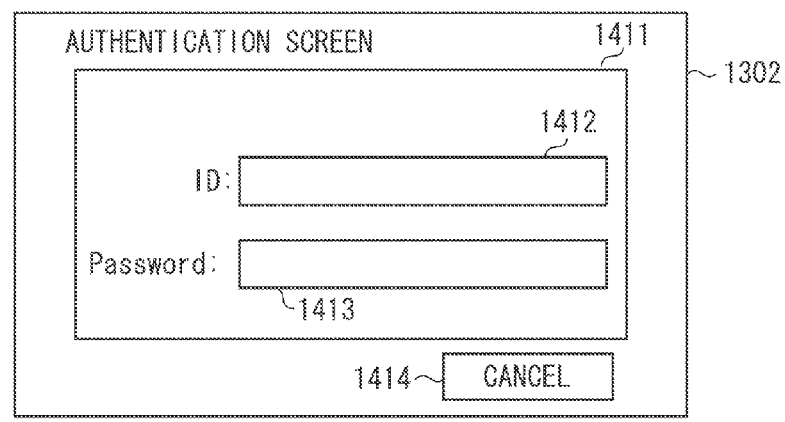
FIG. 14B illustrates an example of an authentication screen displayed on the display screen 1302 of the peripheral device 102.
Figure 14C:
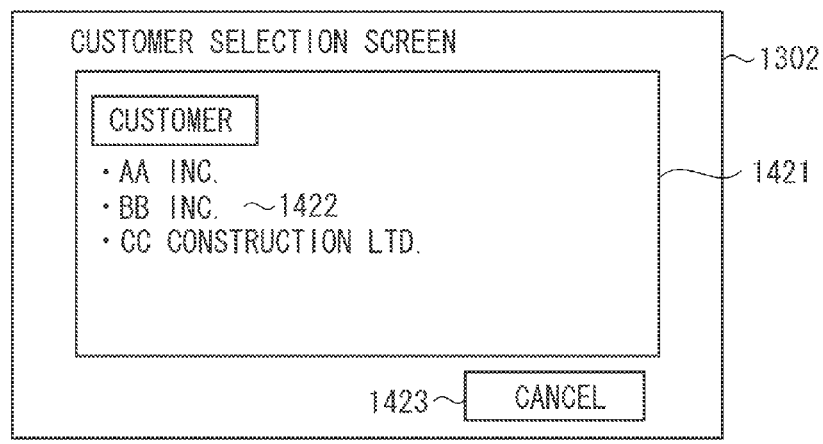
FIG. 14C illustrates an example of a customer selection screen displayed on the display screen 1302 of the peripheral device 102.
Figure 14D:
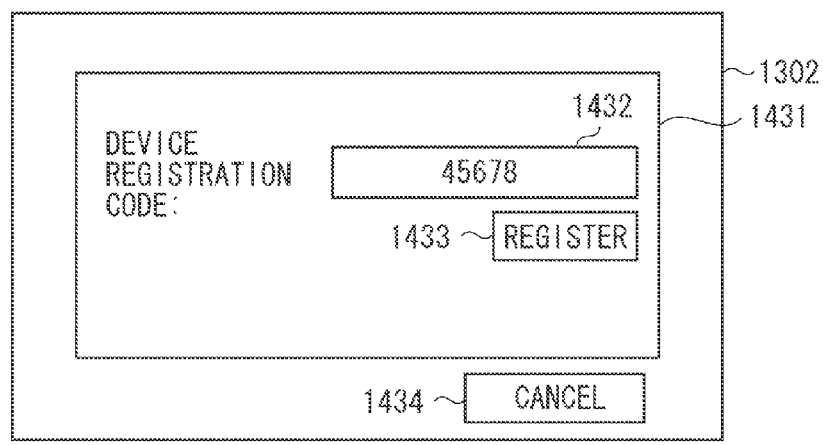
FIG. 14D illustrates an example of a device registration code input screen displayed on the display screen 1302 of the peripheral device 102.

FIG. 14D illustrates a device registration code input screen 1431 displayed on the Panel 409 or the Display 410 of the peripheral device 102. The device registration code input screen 1431 is displayed according to a user's selection of the item INPUT DEVICE REGISTRATION CODE 1403 from the menu displayed by the UI control unit 502.

The user inputs the registration code of the peripheral device 102 that the user wants to register in a device registration code 1432 of the device registration code input screen 1431. The user refers to the customer information displayed on the Display 606 in the above-described step S1605 for the device registration code to be input in the device registration code 1432. Upon pressing of a device registration button 1433, the processing for registering the device is performed. The registration control unit 503 of the peripheral device 102 adds the device registration code input in the device registration code 1432 and the serial No. obtained from the device information management unit 504 of the peripheral device 102 to a device registration request, and transmits this device registration request to the management server 103.

FIG. 17 illustrates a flow of the device registration processing, which is processed in the management server 103 upon reception of the device registration request. The CPU 201 reads out the application program stored in the HD 211, and performs the following steps.

In step S1701, the web service unit 312 of the management server 103 receives the device registration request transmitted from the registration control unit 503 of the peripheral device 102. The device registration request contains the device registration code input by the user and the serial No. of the peripheral device 102 that the user wants to register.

In step S1702, the web service unit 312 makes an inquiry about whether the device registration code is registered with the customer management unit 321. The customer management unit 321 determines whether the device registration code is registered with the customer management table 331 in the database 303 according to the inquiry from the web service unit 312.

If the customer management unit 321 determines in step S1703 that the device registration code is registered (YES in step S1703), the processing proceeds to step S1704. If the customer management unit 321 determines that the device registration code is not registered (NO in step S1703), the processing proceeds to step S1707.

In step S1704, the web service unit 312 instructs the device authentication unit 324 to generate an authentication key. The device authentication unit 324 generates an authentication key of the peripheral device 102 indicated by the serial No. received in step S1701, in response to the instruction from the web service unit 312.

In step S1705, the web service unit 312 registers the customer ID 801 obtained from the customer management unit 321, the serial No. obtained in step S1701, and the authentication key generated in step S1704 with the device management table 332.

In step S1706, the web service unit 312 returns the customer ID and the authentication key generated in step S1704 to the peripheral device 102. Upon reception of the customer ID and the authentication key, the peripheral device 102 stores them into the authentication key storage unit 514. The web service unit 312 may return only the authentication key. After that, when the peripheral device 102 communicates with the management server 103, the peripheral device 102 uses the authentication key stored in the authentication key storage unit 514.

According to the third exemplary embodiment, it is also possible to realize the device registration processing using the Panel 409 or the Display 410 of the peripheral device 102. In the third exemplary embodiment, the user obtains the device registration code 803 by operating the terminal 101. However, if the user has obtained in advance the device registration code of the peripheral device 102 to be registered, the user inputs the device registration code on the peripheral device 102 without performing the obtaining processing for the device registration code 803 by the terminal 101.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-229039 filed Oct. 16, 2012, which is hereby incorporated by reference herein in its entirety.

What is claimed is:

1. A device management system comprising:
a peripheral device;
a management server configured to manage device information of the peripheral device; and
a terminal communicable with the management server,
wherein the peripheral device comprises:
a first generation unit configured to generate key obtaining information for obtaining from the management server an authentication key for generating signature information to be used in transmission of the device information; and
a first transmission unit configured to transmit a request for obtaining the authentication key that contains the key obtaining information and device identification information of the peripheral device, to the management server,
wherein the terminal comprises:
an obtaining unit configured to obtain the key obtaining information from the peripheral device; and a second transmission unit configured to transmit the key obtaining information obtained by the obtaining unit to the management server, and wherein the management server comprises:

a first reception unit configured to receive the key obtaining information from the terminal;

a registration unit configured to register the key obtaining information received from the terminal while associating the key obtaining information with the device identification information of the peripheral device and the authentication key managed by the management server;

a second reception unit configured to receive the obtaining request from the peripheral device;

a determination unit configured to determine whether a key obtaining information that is registered while being associated with the device identification information contained in the received obtaining request from the terminal matches a key obtaining information contained in the received obtaining request; and a response unit configured to, if the determination unit determines that they match each other, transmit the authentication key associated with the key obtaining information received from the terminal to the peripheral device as a response to the obtaining request.

2. The device management system according to claim 1, wherein the peripheral device comprises:

a second generation unit configured to generate signature information in which device information is encoded, with use of the authentication key received from the management server; and a third transmission unit configured to transmit the device information to the management server together with the generated signature information and the device identification information, and wherein the management server comprises:

a verification unit configured to verify the signature information received together with the device information from the peripheral device; and a management unit configured to manage the device information received together with the signature information that is verified by the verification unit while associating the device information with the device identification information.

3. The device management system according to claim 1, wherein the peripheral device comprises:

a third generation unit configured to generate image information that contains the key obtaining information and is formed by encoding an address of the management server; and an output unit configured to output the generated image information, wherein the obtaining unit of the terminal obtains the key obtaining information from the output image information.

4. The device management system according to claim 3, wherein the output unit of the peripheral device displays the image information on a display unit of the peripheral device or prints the image information as an output of the generated image information.

5. The device management system according to claim 3, wherein the first transmission unit repeats transmission of the obtaining request to the management server until the authentication key is received from the management server, according to an output of the generated image information.

6. The device management system according to claim 1, wherein the device information is a history of a job carried out by the peripheral device.

7. The device management system according to claim 1, wherein the terminal comprises a reception unit configured to receive a selection of a customer that owns the peripheral device of a registration destination with which the key obtaining information is to be registered, on a customer selection screen provided by the management server, wherein the second transmission unit transmits customer identification information for identifying the customer corresponding to the selection to the management server together with the key obtaining information, and wherein the registration unit of the management server registers the key obtaining information received from the terminal while associating the key obtaining information with the received customer identification information, and the device identification information and the authentication key managed by the management server.

8. A peripheral device communicable with a management server, comprising:

a first generation unit configured to generate key obtaining information for obtaining from the management server an authentication key for generating signature information to be used in transmission of device information of the peripheral device;

a first transmission unit configured to transmit a request for obtaining an authentication key that contains the key obtaining information and device identification information of the peripheral device, to the management server;

a third generation unit configured to generate image information that contains the key obtaining information and is formed by encoding an address of the management server;

an output unit configured to output the generated image information for a terminal communicable with the management server;

a second generation unit configured to, if the management server determines that a key obtaining information from the terminal matches a key obtaining information contained in the obtaining request, generate signature information in which the device information is encoded with use of an authentication key contained in a response to the obtaining request that is received from the management server; and a third transmission unit configured to transmit the device information to the management server together with the generated signature information and the device identification information.

9. The peripheral device according to claim 8, wherein the output unit displays the image information on a display unit of the peripheral device or prints the image information as an output of the generated image information.

10. The peripheral device according to claim 8, wherein the first transmission unit repeats transmission of the obtaining request to the management server until the authentication key is received from the management server, according to an output of the generated image information.

11. The peripheral device according to claim 8, wherein the device information is a history of a job carried out by the peripheral device.

12. A method for a device management system comprising a peripheral device, a management server configured to manage device information of the peripheral device, and a terminal communicable with the management server, the method comprising:

a method of the peripheral device comprising:

performing first generation of generating key obtaining information for obtaining from the management server an authentication key for generating signature information to be used in transmission of the device information; and performing first transmission of transmitting a request for obtaining the authentication key that contains the key obtaining information and device identification information of the peripheral device, to the management server;

a method of the terminal comprising:

obtaining the key obtaining information from the peripheral device; and performing second transmission of transmitting the obtained key obtaining information to the management server;

a method of the management server comprising:

performing first reception of receiving the key obtaining information from the terminal;

registering the key obtaining information received from the terminal while associating the key obtaining information with the device identification information of the peripheral device and the authentication key managed by the management server;

performing second reception of receiving the obtaining request from the peripheral device;

determining whether a key obtaining information that is registered while being associated with the device identification information contained in the received obtaining request from the terminal matches a key obtaining information contained in the received obtaining request; and performing response to transmitting the authentication key associated with the key obtaining information received from the terminal to the peripheral device as a response to the obtaining request, if it is determined in the determination that they match each other.

13. A method for a peripheral device communicable with a management server, comprising:

performing first generation of generating key obtaining information for obtaining from the management server an authentication key for generating signature information to be used in transmission of device information of the peripheral device;

transmitting a request for obtaining the authentication key that contains the key obtaining information and device identification information of the peripheral device, to the management server;

generating image information that contains the key obtaining information and is formed by encoding an address of the management server;

outputting the generated image information for a terminal communicable with the management server;

generating, when the management server determines that a key obtaining information from the terminal matches a key obtaining information contained in the obtaining request, signature information in which the device information is encoded with use of an authentication key contained in a response to the obtaining request that is received from the management server; and transmitting the device information to the management server together with the generated signature information and the device identification information.

* * * * *